June 25, 1963
R. B. CUSTER ETAL
3,095,514
VOLTAGE REGULATING CIRCUIT
Filed Feb. 13, 1959
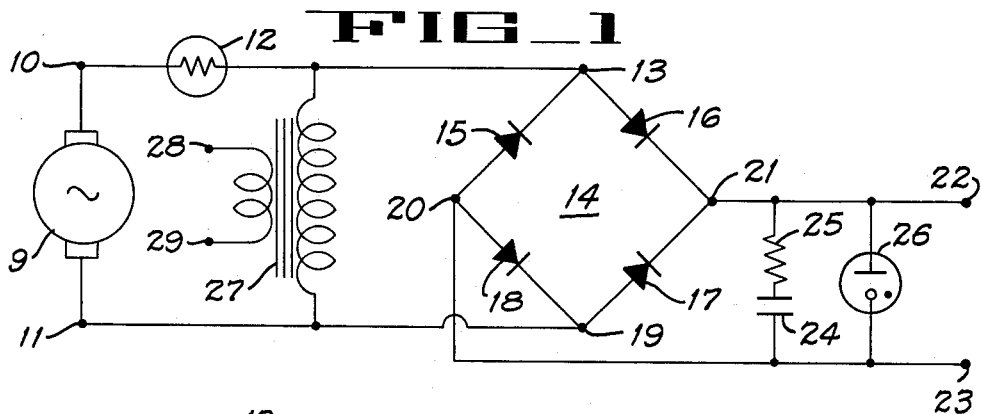
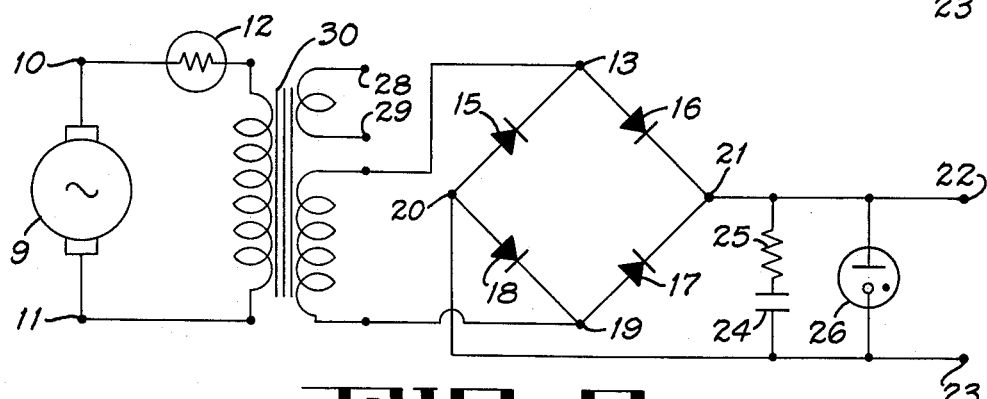
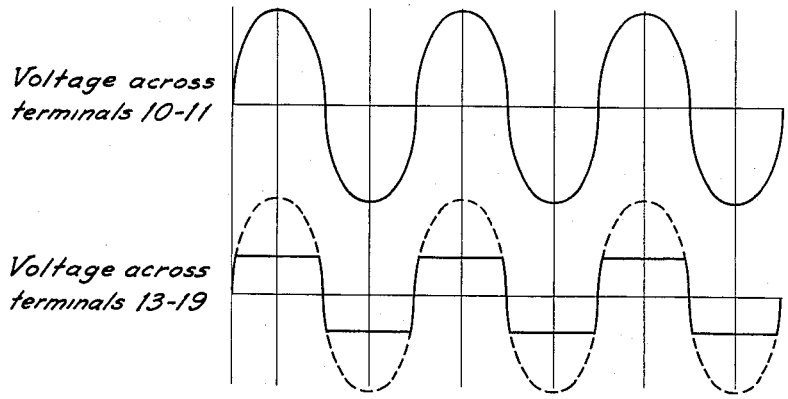
INVENTORS
ROLLA B. CUSTER
CLARENCE FIELD
BY *John B. Clark*
ATTORNEY

United States Patent Office 3,095,514
Patented June 25, 1963

---

3,095,514
VOLTAGE REGULATING CIRCUIT
Rolla B. Custer, Santa Cruz, Calif. (Rte. 4, Box 420, Lodi, Calif.), and Clarence Field, 1335 17th Ave., Santa Cruz, Calif.
Filed Feb. 13, 1959, Ser. No. 793,082
5 Claims. (Cl. 307—150)

The present invention pertains generally to voltage regulating circuits and relates more particularly to a circuit for providing both regulated A.C. voltage and regulated D.C. voltage.

D.C. voltage regulating circuits, in the prior art, commonly employ voltage regulating tubes which are connected in series with a current limiting resistor across the D.C. supply for providing a regulated D.C. voltage across the tube. The voltage which is in excess of the voltage rating of the regulating tube appears across the current limiting resistor. Further, A.C. voltage regulation may be similarly provided by clipping the A.C. peaks at the desired value with the use of voltage regulator tubes. Since both positive and negative peaks are involved, however, it is necessary to provide circuitry for regulating the peaks of either polarity. This usually calls for the provision of at least two voltage regulating tubes.

The present invention is directed to a circuit wherein a single voltage regulator tube is employed to provide both A.C. and D.C. regulation. According to the invention, the A.C. supply voltage is first rectified to provide a pulsating D.C. voltage and the pulsating D.C. peaks are connected across the voltage regulator tube for clipping these peaks at the desired level. A constant current device, such as a ballast tube, is placed in the A.C. circuit between the A.C. supply and the rectifier circuit, and when the pulsating D.C. peaks exceed the rating of the voltage regulating tube, the tendency for the current flow through the tube to increase causes the voltage drop across the constant current device to increase thereby effectively clipping the A.C. peaks at the desired value. This prevents overload of the tube as well as provides regulation of the A.C. voltage with the use of the simplified circuitry described. The regulated A.C. voltage may be taken from the line connecting the constant current device to the rectifier.

Thus, it is an object of the present invention to provide an improved voltage regulator circuit.

Another object is to provide a simplified circuit for regulating A.C. voltage.

A further object is to provide an improved circuit which is simple and inexpensive for regulating both A.C. and D.C. voltages.

It should be noted that the A.C. voltage may be regulated through the use of suitably connected voltage regulator tubes and that the regulated A.C. voltage may then be connected through a suitable rectifier and filter circuit to the D.C. load. Since the A.C. voltage is regulated, the filtered D.C. voltage provided to the load will also be regulated. However, a disadvantage of such a circuit is that load variations will cause voltage variations due to the voltage drop in the rectifier circuit and where there are variations in the D.C. load the D.C. regulation provided by such a circuit leaves something to be desired. By arranging the circuit components according to the present invention, reasonable variations in the D.C. load do not affect the D.C. regulation since the voltage regulating tube is connected directly across the load.

Thus, a further object of the invention is to provide an improved circuit for regulating both A.C. and D.C. voltages having improved regulating characteristics.

These and other objects, as well as advantages of the invention, will become apparent from the following detailed description and the accompanying drawing wherein:

FIG. 1 is a schematic diagram of one embodiment of the invention;

FIG. 2 is a schematic diagram of another embodiment of the invention; and

FIG. 3 discloses wave forms provided to aid in understanding the disclosed embodiments of the invention.

Referring now to FIG. 1, terminals 10 and 11 are provided for connecting to an A.C. voltage source 9 which supplies the voltage to be regulated by the circuitry of the invention. The terminal 10 connects through a constant current device, such as a ballast lamp 12, to one input to terminal 13 of a conventional full wave rectifier 14 comprising diodes 15, 16, 17 and 18. The ballast lamp 12 may be of the type presently manufactured by the Amperite Corporation, which consists of an iron filament contained in a gas filled envelope and which maintains its rated current value while the voltage across it varies over a predetermined range. The diodes 15, 16, 17 and 18 are preferably of the low resistance silicon type, though any suitable variety may be employed. The second input terminal 19 of the rectifier 14 connects to the terminal 11.

The output terminals 20 and 21 of the rectifier 14 connect to terminals 22 and 23 across which the D.C. load to receive the regulated D.C. voltage may be placed. A filter comprising a condenser 24 in series with a resistor 25 connects across terminals 22 and 23, as does a voltage regulating tube 26, such as a commercially available type OA3 gas voltage regulating tube.

Assuming a type OA3 tube is utilized, this tube has a rated value of close to 75 volts and will limit the voltage across terminals 22 and 23 to this value. The function of the condenser 24 is to smooth out the ripple of the pulsating D.C. voltage connected thereacross, the resistor 25 being provided to limit the discharge rate of the condenser 24 to thereby prevent oscillation of the circuit comprising the condenser 24 and the tube 26. If the voltage across terminals 22 and 23 starts to rise above 75 volts, the current through the tube 26 starts to rise. This causes the current through the lamp 12 to increase thereby increasing the voltage drop thereacross which results in limiting the A.C. peaks across terminals 13 and 19 to a value around 75 volts, i.e., to a value equal to the rated voltage drop of tube 26 plus the voltage drops in the rectifier circuit 14. Thus, both the A.C. and D.C. voltages are regulated under control of the tube 26 and lamp 12, and the regulated D.C. voltage available at terminals 22 and 23 is reasonably insensitive to reasonable variations in load.

It will now be understood that the A.C. voltage connected across terminals 13 and 19 is regulated and can be connected across the primary of a filament transformer 27, or the like, providing a regulated A.C. filament voltage across terminals 28 and 29 connected to either side of the secondary of transformer 27. Thus, according to the teaching of the invention, the simplified circuitry shown in the drawings controls and provides regulation of both D.C. voltages and A.C. voltages which may be utilized to supply power to apparatus wherein such regulation is desirable.

The embodiment of the invention shown in FIG. 2, is substantially the same as that disclosed in FIG. 1 with the exception that the A.C. voltage source 9 is transformer coupled to the rectifier circuit. Similar components are identified by like reference numerals. The primary of a transformer 30 connects through the ballast lamp 12 to terminals 10 and 11, the high voltage secondary winding of transformer 30 being connected across terminals 13 and 19 of the rectifier 14. A second secondary winding, such as a low voltage filament winding connects to terminals 28 and 29 for providing a regulated A.C. filament voltage as described above. The circuit shown in FIG. 2 operates in a similar manner to that described in connection with FIG. 1 to provide regulated D.C. voltage across the terminals 22 and 23 as well as providing regulated A.C. voltage across the primary of transformer 30.

It will be understood that the invention is not limited to the identical circuitry shown but that the rectifier circuitry illustrated could be replaced by a suitable voltage doubler circuit, or the like, where such is desirable. Thus, while there have been shown and described and pointed out the fundamental novel features of the invention as applied to the preferred embodiments, various omissions and substitutions and changes in the form and details of the circuitry disclosed and in its operation may be made by those skilled in the art without departing from the spirit of the invention. It is the intention, therefore, to be limited only as indicated by the scope of the following claims.

What is claimed is:

1. A voltage regulating circuit comprising an A.C. voltage source, rectifier means having input and output terminals, means connecting said A.C. source across said input terminals, said means including a constant current device, A.C. utilizing means connected across said input terminals and a constant voltage device connected directly across said output terminals for limiting the voltage thereacross, the voltage drop across said constant current device being increased when the voltage across said constant voltage device tends to increase due to the increased current flow through said constant voltage device, regulated D.C. voltage being provided across said output terminals and regulated A.C. voltage being provided across said A.C. utilizing means.

2. A voltage regulating circuit comprising an A.C. voltage source, a full wave rectifier having input terminals and output terminals, means connecting said A.C. source across said input terminals, said means including a ballast lamp having a resistance which varies directly with current flow therethrough, a transformer having a primary winding and a secondary winding, said primary winding being connected across said input terminals, a filter circuit connected across said output terminals for smoothing the D.C. ripple appearing thereacross, and a voltage regulating tube connected directly across said output terminals for limiting the voltage thereacross, the resistance of said ballast lamp being controlled to increase where the voltage across said tube tends to increase due to the increased current through said tube for limiting the A.C. voltage peaks across said input terminals, the D.C. voltage across said output terminals being regulated and the A.C. voltage across the secondary of said transformer being regulated.

3. A voltage regulating circuit comprising an A.C. voltage source, a transformer including a primary winding and first and second secondary windings, means including a constant current device connecting said A.C. source across said primary winding, rectifier means having input terminals and output terminals, means connecting said first secondary winding across said input terminals, means connecting a filter circuit across said output terminals, and means connecting a constant voltage device directly across said output terminals, the increase in current through said constant voltage device due to an increase in the A.C. voltage provided by said source causing an increase in the A.C. voltage drop across said constant current device for limiting the A.C. voltage peaks applied to said primary circuit, and thereby supplying a regulated A.C. voltage to said primary winding, whereby regulated A.C. voltage is available across said second secondary winding and a regulated D.C. voltage is available across said output terminals.

4. A voltage regulating circuit comprising an A.C. voltage source, a transformer including a primary winding and first and second secondary windings, means including a ballast tube having a resistance which varies directly with the current flowing therethrough connecting said A.C. source across said primary winding, rectifier means having input terminals and output terminals, means connecting said first secondary winding across said input terminals, means connecting a filter circuit across said output terminals, and means connecting a voltage regulating tube having a resistance which decreases with the voltage thereacross directly across said output terminals, the increase in current through said voltage regulating tube due to an increase in the A.C. voltage provided by said source causing an increase in the A.C. voltage drop across said ballast tube for limiting the A.C. voltage peaks applied to said primary circuit, and thereby supplying a regulated A.C. voltage to said primary winding, whereby regulated A.C. voltage is available across said second secondary winding and a regulated D.C. voltage is available across said output terminals.

5. A voltage regulating circuit comprising an A.C. voltage source, a transformer including a primary winding and first and second secondary windings, means including a ballast tube having constant current characteristics connecting said voltage source across said primary winding, a full wave rectifier including low resistance silicon diodes, said rectifier including input terminals and output terminals, means connecting said input terminals across said first secondary winding, means connecting a filter circuit including a condenser and a resistor in series across said output terminals said condenser being provided for smoothing the pulsating D.C. voltage appearing thereacross and said resistor being provided for damping the discharge of said condenser, and means connecting a voltage regulating tube having constant voltage characteristics directly across said output terminals, the current flow through said voltage regulating tube increasing with an increase in the A.C. voltage of said source for causing the voltage drop across said ballast tube to increase accordingly, whereby the A.C. voltage across said input terminals is regulated for supplying regulated A.C. voltage across said second secondary winding and for supplying a regulated D.C. voltage across said output terminals.

References Cited in the file of this patent

UNITED STATES PATENTS

| | | |
|---|---|---|
| 1,829,254 | Asch | Oct. 27, 1931 |
| 2,232,070 | Jones | Feb. 18, 1941 |
| 2,713,140 | Bixby | July 12, 1955 |
| 2,830,252 | Amey et al. | Apr. 8, 1958 |
| 3,032,703 | Lowrance | May 1, 1962 |